(12) United States Patent
Carr et al.

(10) Patent No.: US 10,181,151 B2
(45) Date of Patent: Jan. 15, 2019

(54) METHODS AND SYSTEMS FOR COMBINING ONLINE ORDERS WITH ADDITIONAL PURCHASES

(71) Applicant: Wal-Mart Stores, Inc., Bentonville, AR (US)

(72) Inventors: David Jon Carr, Mountain View, CA (US); Richard Mark Ramsden, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 902 days.

(21) Appl. No.: 14/526,242

(22) Filed: Oct. 28, 2014

(65) Prior Publication Data

US 2016/0117756 A1   Apr. 28, 2016

(51) Int. Cl.
G06Q 30/00    (2012.01)
G06Q 30/06    (2012.01)

(52) U.S. Cl.
CPC ................ *G06Q 30/0635* (2013.01)

(58) Field of Classification Search
CPC ...................................... G06Q 30/00
See application file for complete search history.

(56) References Cited

U.S. PATENT DOCUMENTS

| | | | |
|---|---|---|---|
| 3,774,723 A | 11/1973 | Johnston | |
| 4,189,031 A | 2/1980 | Vayda, Jr. | |
| 5,016,736 A | 5/1991 | Vayda | |
| 5,482,139 A | 1/1996 | Rivalto | |
| 6,015,167 A * | 1/2000 | Savino | B42D 15/00 283/67 |
| 6,116,505 A | 9/2000 | Withrow | |
| 6,193,154 B1 | 2/2001 | Phillips | |
| 6,957,197 B1 * | 10/2005 | Altendahl | G06Q 10/047 235/375 |
| 7,107,228 B1 * | 9/2006 | Walker | G06Q 20/20 705/16 |
| 7,389,919 B2 | 6/2008 | Walker | |
| 7,496,525 B1 * | 2/2009 | Mitchell | G06Q 30/06 705/26.8 |
| 7,627,498 B1 * | 12/2009 | Walker | G06Q 30/02 705/26.1 |
| 8,615,444 B2 | 12/2013 | Walker | |
| 2005/0071240 A1 * | 3/2005 | Ewald | G06Q 30/06 705/26.81 |
| 2007/0276741 A1 * | 11/2007 | Tuttrup | G06Q 10/08 705/26.2 |

(Continued)

OTHER PUBLICATIONS

Velazco, Chris, "OneReceipt tracks your online purchaes, takes aim at Lemon and slice", Techcrunch, dated Nov. 28, 2011 (Year: 2011).*

*Primary Examiner* — Mark A Fadok
(74) *Attorney, Agent, or Firm* — Bryan Cave Leighton Paisner LLP

(57) ABSTRACT

Various examples of methods and systems for combining online order with additional purchase during pickup of the online order are described. In one implementation, a method may receive a first order to purchase at least a first item from a user via a first channel. The method may also receive a second order to purchase at least a second item from the user via a second channel different from the first channel. The method may further process the first order and the second order in a single transaction.

20 Claims, 5 Drawing Sheets

(56) References Cited

U.S. PATENT DOCUMENTS

| | | | |
|---|---|---|---|
| 2008/0052186 A1* | 2/2008 | Walker | G06Q 30/02 |
| | | | 705/26.1 |
| 2010/0010902 A1 | 1/2010 | Casey | |
| 2011/0112936 A1 | 5/2011 | Hendrickson | |
| 2014/0000188 A1 | 1/2014 | Vayda | |
| 2015/0088731 A1* | 3/2015 | Ackerman | G06Q 30/0603 |
| | | | 705/39 |
| 2016/0063588 A1* | 3/2016 | Gadre | G06Q 30/0623 |
| | | | 705/26.61 |

\* cited by examiner

METHODS AND SYSTEMS FOR COMBINING ONLINE ORDERS WITH ADDITIONAL PURCHASES

TECHNICAL FIELD

The present disclosure relates to methods and systems for combining an online order with an additional purchase into a single transaction.

BACKGROUND

With the increasing trend of online shopping, a brick-and-mortar merchant that operates a number of physical stores to sell products and services may also utilize the Internet as an additional avenue to sell the products and services. For example, in addition to its existing physical stores, a merchant may also operate an electronic commerce (e-commerce) website through which consumers can purchase one or more of the products and services offered by the merchant.

In some cases, a consumer may place an order for a product or service via the website of the merchant, and the consumer still needs to visit one of the physical stores of the merchant to either pick up the product or receive the service purchased online. Upon arriving at the physical store to pick up the product or receive the service, the consumer may need to wait for an amount of time for the purchased product or service to be prepared or collected for delivery to the consumer. Besides, while at the physical store, if the consumer decides to purchase one or more additional products and/or services, this in-store purchase and the previously-made online order may be treated by the merchant as two separate transactions.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
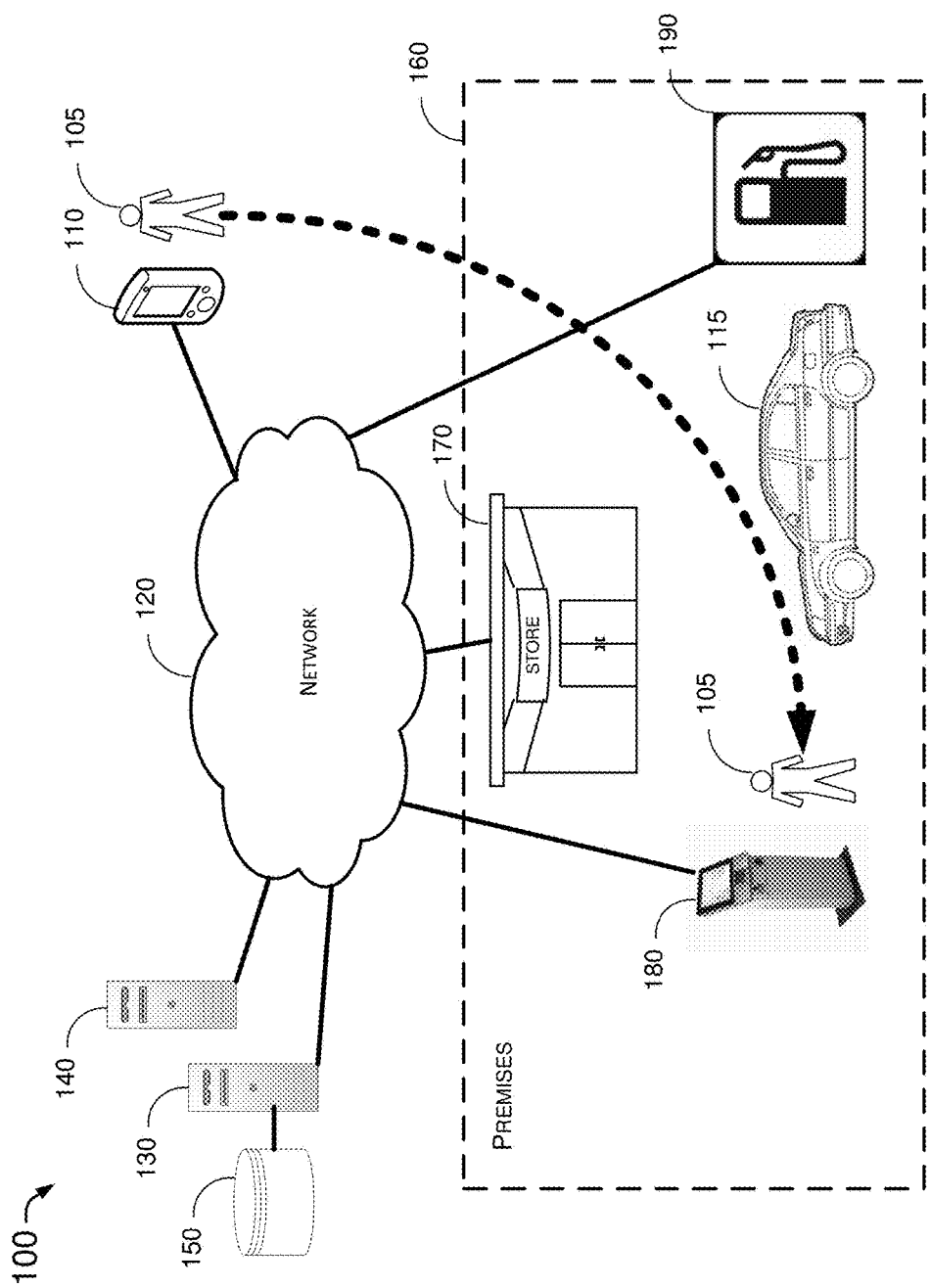
FIG. 1 is a diagram depicting an example computing environment in which example embodiments may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The articles "a" and "an" are used herein to refer to one or to more than one (i.e. to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

FIG. 1 is a diagram depicting an example computing environment 100 in which example embodiments may be implemented. In example computing environment 100, a brick-and-mortar merchant that operates a number of physical stores (including a physical store 170) to sell products and services may also allow online shopping of its products and services by online shoppers (herein interchangeably referred to as users), e.g., a user 105 using a user device 110, at an e-commerce website hosted on a web server 140 via a network 120. Example computing environment 100 may also include a transaction server 130 in which embodiments of the present disclosure are implemented so that transaction server 130 is configured to combine an online order with an additional purchase, made by user 105 during pickup of the online order, into a single transaction. For example, transaction server 130 may be configured to perform operations of each of example processes 300, 400 and 500 described below. Transaction server 130 may be communicatively connected to a database 150 via network 120 or a local area network. In some embodiments, database 150 may be an integral part of transaction server 130. Database 150 may record, store or otherwise contain therein data associated with a set of products and/or services that are available for sale at the e-commerce website hosted on web server 140 and can be picked up at physical store 170. Although one web server 140 is shown in FIG. 1, some embodiments may use multiple web servers 140 to implement an e-commerce website.

Physical store 170 may be located at a location or premises 160 operated by, rented by, owned by or otherwise associated with the merchant. As shown in FIG. 1, within premises 170 there are also a gas station 190 and a kiosk 180. In some embodiments, both kiosk 180 and gas station 190 are operated by or otherwise associated with the merchant. Both kiosk 180 and gas station 190 are in a close proximity of physical store 170. In some embodiments, kiosk 180 and gas station 190 are physically separated. Alternatively, kiosk 180 may be installed next to a gas pump of gas station 190. In other embodiments, kiosk 180 may be implemented in a gas pump of gas station 190. Physical store 170 may include one or more computing devices (not shown) that are communicatively connected to network 120. User device 110, transaction server 130, web server 140, the one or more computing devices at physical store 170, kiosk 180 and one or more gas pumps of gas station 190 may be communicatively connected to each other via network 120.

When user 105 visits premises 160 to pick up an order placed online, e.g., via user device 110, user 105 may also purchase some gasoline for a car 115 at gas station 190. For example, in one scenario, user 105 may first visit the e-commerce website of the merchant hosted on web server 140 to place an online order via user device 110 and, at a later time, drive to premises 160 to pick up one or more products or receive one or more services purchased in the online order, e.g., through a drive-through lane associated with or next to physical store 170. Kiosk 180 may be disposed at location of premises 160 such that, upon arriving at premises 160, user 105 may first encounter kiosk 180 before reaching physical store 170 and/or gas station 190. Kiosk 180 may be a check-in point for user 105 to inform staff at physical store 170 of their arrival, e.g., for the purpose of picking up the online order. Upon receiving the indication of the arrival of user 105, a question may be presented to user 105 via kiosk 180 to see whether user 105 may be interested in purchasing one or more items, e.g., gasoline, in addition to the one or more items of the previously-placed online order. In response, user 105 may provide an indication, e.g., via kiosk 180, of their interest in purchasing one or more items in addition to the one or more items of the online order.

Using gasoline at gas station 190 as an example, user 105 may purchase gasoline at gas station 190 in addition to the one or more items of the online order for which user 105 comes to physical store 170 to pick up. Embodiments of the present disclosure may treat the online order and the later-placed order for one or more additional items by user 105 as a single transaction and process the two orders together in a single transaction.

Advantageously, the ability to allow users who have placed online orders to order one or more additional items when a user comes to a physical store to pick up the item(s) of a previously-placed online order saves time for the user. For example, when user 105 awaits staff of physical store 170 to prepare, collect and deliver the one or more items of the online order, user 105 may simultaneously add gasoline to car 115. From the perspective of the merchant, such ability may help increase total sales revenue and improve customer satisfaction and loyalty.

User device 110 may be a mobile device such as a smartphone, a laptop computer, a notebook computer, a tablet computer, a wearable computer, a desktop computer, a personal data assistant (PDA), an internet appliance, a server or any other computing device configured with a network connection. Each of web server 140 and transaction server 130 may include one or more servers or any suitable computing device configured with a network connection. Each of transaction server 130 and web server 140 may be operated by the merchant or a respective service provider. In some embodiments, transaction server 130 and web server 140 may be implemented together in one or more servers or computing devices.

Network 120 may include wired and/or wireless networks that enable communications between the various networked devices associated with example computing environment 100, such as user device 110, transaction server 130, web server 140, one or more computing devices of physical store 170, and kiosk 180. Network 120 may include a variety of different networked devices that are of different types and families. In some embodiments, network 120 may include one or more local area networks (LANs), one or more wide area networks (WAN), one or more mobile telephone networks (MTNs), and/or other types of networks, possibly in conjunction with one another, to facilitate communication among the various networked devices of FIG. 1.

Figure 2:
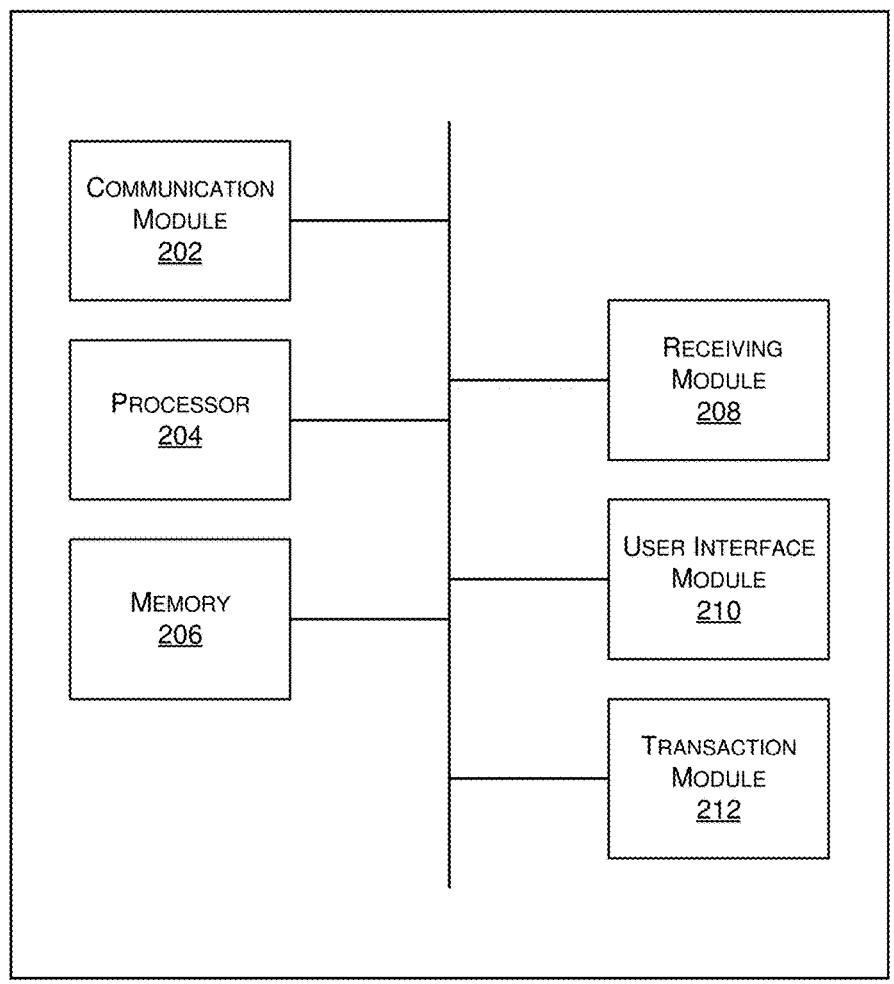
FIG. 2 is a block diagram depicting an embodiment of a transaction server configured to combine online orders with additional purchases.

FIG. 2 is a block diagram depicting an embodiment of a transaction server 200 configured to combine online orders with additional purchases. Transaction server 200 may perform various functions related to embodiments of the present disclosure. In some embodiments, transaction server 200 may be implemented in or as transaction server 130 of FIG. 1. In some embodiments, transaction server 200 may be implemented as one or more computing devices that cooperatively implement the functions described herein. Transaction server 200 may include a communication module 202, one or more processors (shown as a processor 204 in FIG. 2), and a memory 206. Communication module 202 may allow transaction server 200 to communicate with other networks, systems, servers, computing devices, etc. Processor 204 may execute one or more sets of instructions to implement the functionality provided by transaction server 200. Memory 206 may store the one or more sets of instructions executable by processor 204 as well as other data used by processor 204.

Transaction server 200 may also include a receiving module 208, a user interface module 210 and a transaction module 212. Each of receiving module 208, user interface module 210 and transaction module 212 may perform one or more functions under the control of processor 204. For example, under the control of processor 204, each of receiving module 208, user interface module 210 and transaction module 212 may perform one or more operations of each of example processes 300, 400 and 500 described below. Although receiving module 208, user interface module 210 and transaction module 212 are depicted in FIG. 2 as discrete modules separate from the processor 204, in various implementations one or more of receiving module 208, user interface module 210 and transaction module 212 may be integral part of processor 204. For simplicity, a task or function performed by any of receiving module 208, user interface module 210 and transaction module 212 may be described as if such task or function is performed by processor 204.

Receiving module 208 may be configured to receive online orders for purchase of products and services that can be picked up and/or received at physical store 170. For example, receiving module 208 may receive a first order for at least a first item placed by user 105 via the e-commerce website associated with the merchant and hosted on web server 140. Receiving module 208 may also be configured to receive an indication, from each user, of a selection by the user of one of the physical stores owned by, operated by or otherwise associated with the merchant for pickup of the one or more items of an online order placed by the user. For example, receiving module 208 may receive a first indication that indicates a selection user 105 of a physical store associated with the merchant, e.g., physical store 170, for pickup of the first order. Receiving module 208 may be further configured to receive an indication, from each user, that indicates the arrival of the user at a location associated with a physical store which was selected by the user as the physical store where the user will pick up the online order. For example, receiving module 208 may receive from kiosk 180 a second indication made by user 105 at kiosk 180 that indicates arrival of user 105 at premises 160.

User interface module 210 may be configured to provide a choice to the user for the user to place a second order to purchase at least a second item, such as one or more products and/or services available for sale at physical store 170. For example, user interface module 210 may cause kiosk 180 to present a question, whether by either or both visual and audio means such as through a display panel and/or one or more speakers of kiosk 180, to user 105 to see if user 105 would like to purchase gasoline at gas station 190. User interface module 210 may also be configured to receive a response from the user in response to the question. For example, user interface module 210 may receive via kiosk 180 an indication from user 105, e.g., by vocal response, entry of textual response on a touch sensing display or keyboard, or gesture or facial expression captured by a camera of kiosk 180, whether or not user 105 is interested in purchasing gasoline for car 115. User interface module 210 may be also configured to provide to the user an acknowledgement of the payment for the single transaction in response to receiving the indication of the payment. For example, user interface module 210 may cause kiosk 180 to display a message, whether visually or audibly, to user 105 that the payment for the single transaction has been received. A receipt may, for example, be printed at kiosk 180 or a gas pump of gas station 190 for user 105 to keep.

Receiving module 208 may be additionally configured to receive the second order for at least the second item. For example, if user 105 indicates at kiosk 180 an interest in purchasing gasoline at gas station 190 for car 115, receiving module 208 may receive, via kiosk 180, an order for gasoline from user 105.

Transaction module 212 may be configured to process the first order and the second order as a single transaction. For example, in the case that user 115 also purchases gasoline at gas station 190 while waiting to pick up the one or more items of the online order previously placed, transaction module 212 may process the online order and the purchase of gasoline in a single transaction. Transaction module 212 may, for example, charge a credit card or debit card of user 105, whether already on file in a record kept by the merchant or swiped by user 105 at kiosk 180 or gas station 190, once for both the online order and the purchase of gasoline. Accordingly, user 105 may receive one receipt for both the online order and the purchase of gasoline, and may see one entry in a credit card or debit card statement for the online order and the purchase of gasoline.

Transaction module 212 may also be configured to collect payment for the single transaction via a payment method associated with user 105. For example, transaction module 212 may contact a bank associated with the credit card or debit card used by user 105 to charge a corresponding amount to an account of user 105 at the bank. Transaction module 212 may be further configured to receive an indication of payment by the user for the single transaction. For example, transaction module 212 may receive an indication from gas station 190 or a bank associated with the credit card or debit card used by user 105 that a payment is made by user 105 for the single transaction.

Figure 3:
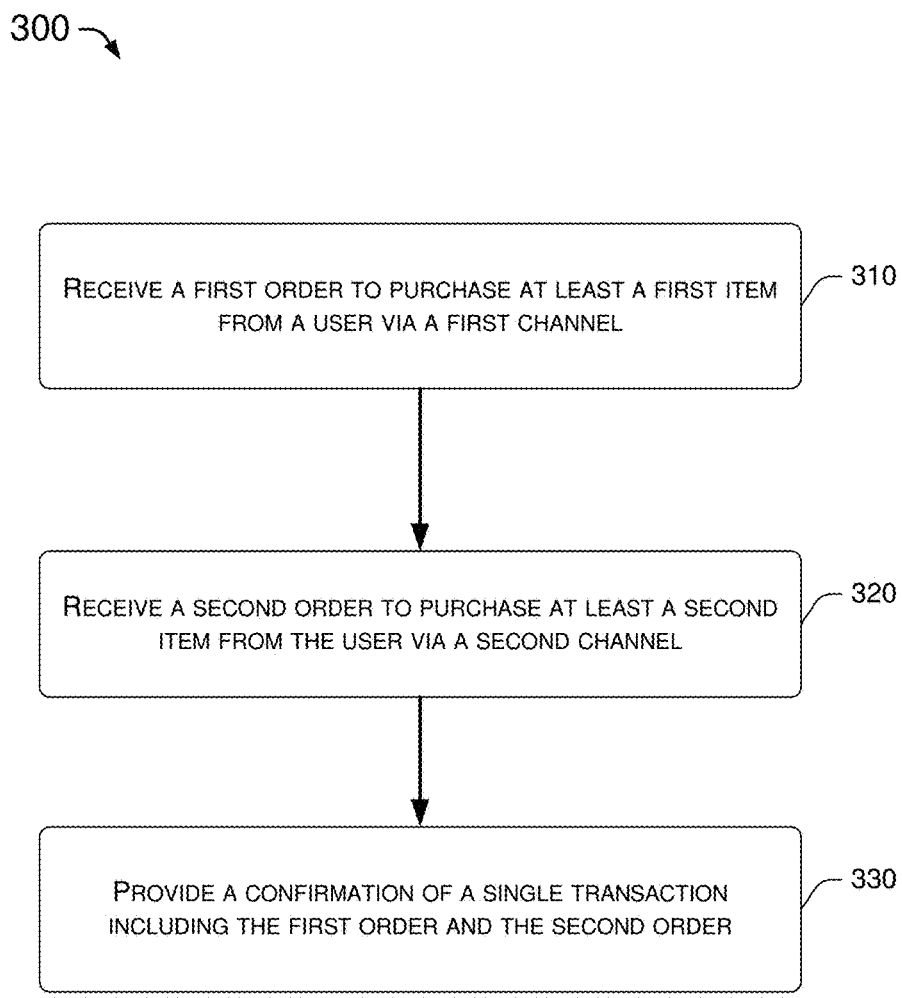
FIG. 3 is a flowchart diagram of an example process for combining online orders with additional purchases.

FIG. 3 is a flowchart diagram of an example process 300 for combining online orders with additional purchases. Example process 300 may include one or more operations, actions, or functions such as 310, 320 and 330. Although illustrated as discrete blocks, various blocks may be divided into additional blocks, combined into fewer blocks, or eliminated, depending on the desired implementation. Example process 300 may be implemented by one or more processors including, for example, processors of transaction server 130 and/or transaction server 200. For illustrative purposes, the operations described below are performed by one or more processors of transaction server 130 and/or processor 204 of transaction server 200. Each of transaction server 130 and transaction server 200 may be referred to as a computing device herein.

At 310, one or more processors of transaction server 130 or transaction server 200 may receive a first order to purchase at least a first item from a user via a first channel.

At 320, the one or more processors of transaction server 130 or transaction server 200 may receive a second order to purchase at least a second item from the user via a second channel different from the first channel.

At 330, the one or more processors of transaction server 130 or transaction server 200 may provide a confirmation of a single transaction including the first order and the second order. For example, the one or more processors of transaction server 130 or transaction server 200 may cause kiosk 180 to display a confirmation, e.g., an invoice, to user 105 that both the first order and the second order are combined into a single transaction.

In at least some embodiments, in receiving the first order via the first channel, example process 300 may involve the one or more processors of transaction server 130 or transaction server 200 receiving the first order from a website associated with a merchant. In at least some embodiments, the first item may include an item offered for sale online at a website associated with the merchant.

In at least some embodiments, in receiving the second order via the second channel, example process 300 may involve the one or more processors of transaction server 130 or transaction server 200 receiving the second order from a kiosk associated with a merchant. In at least some embodiments, the second item may include gasoline offered for sale at a physical store associated with a merchant. In some embodiments, the first order and the second order are received at different times and on different dates.

In at least some embodiments, example process 300 may further involve the one or more processors of transaction server 130 or transaction server 200 informing the user of availability of at least the second item via the second channel.

In at least some embodiments, example process 300 may further involve the one or more processors of transaction server 130 or transaction server 200 receiving an indication of receipt of a payment from the user in a single transaction for the first order and the second order.

Figure 4:
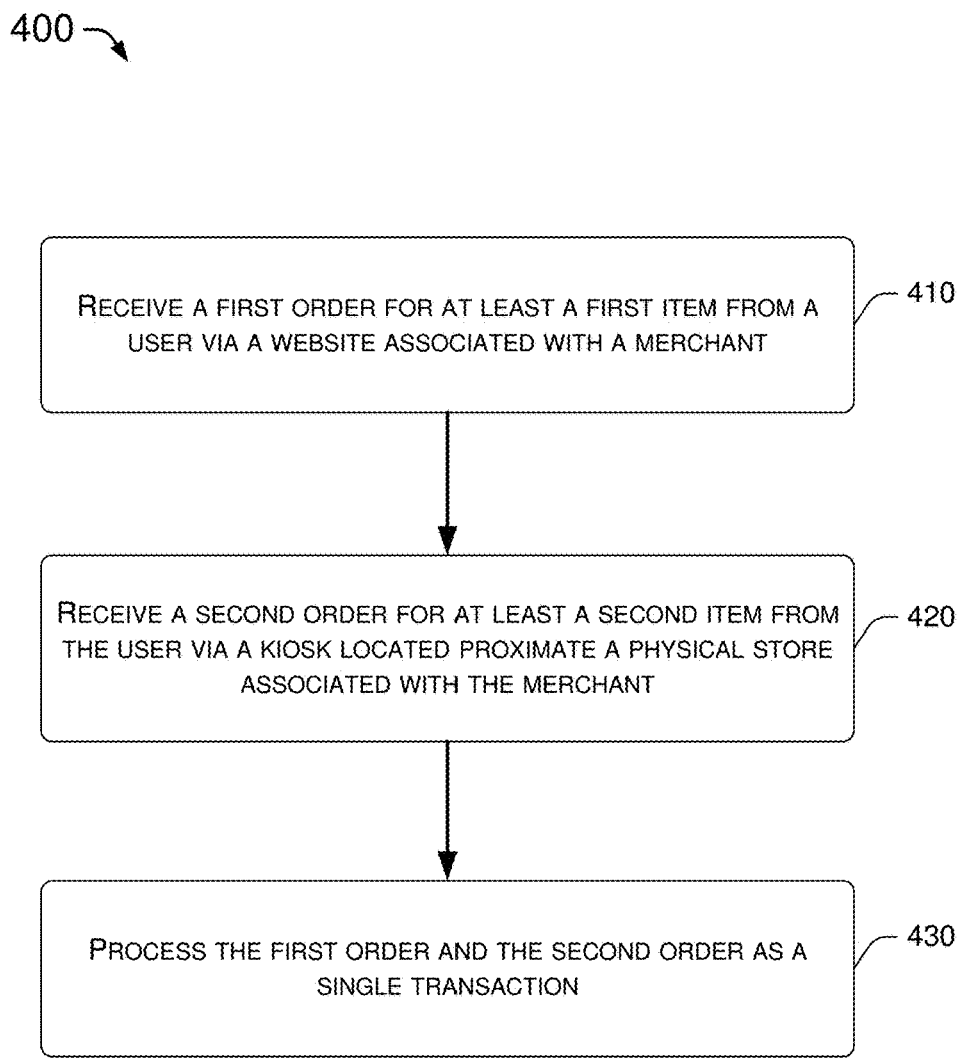
FIG. 4 is a flowchart diagram of another example process for combining online orders with additional purchases.

FIG. 4 is a flowchart diagram of another example process for combining online orders with additional purchases. Example process 400 may include one or more operations, actions, or functions such as 410, 420 and 430. Although illustrated as discrete blocks, various blocks may be divided into additional blocks, combined into fewer blocks, or eliminated, depending on the desired implementation. Example process 400 may be implemented by one or more processors including, for example, processors of transaction server 130 and/or transaction server 200. For illustrative purposes, the operations described below are performed by one or more processors of transaction server 130 and/or processor 204 of transaction server 200. Each of transaction server 130 and transaction server 200 may be referred to as a computing device herein.

At 410, one or more processors of transaction server 130 or transaction server 200 may receive a first order for at least a first item from a user via a website associated with a merchant.

At 420, the one or more processors of transaction server 130 or transaction server 200 may receive a second order for at least a second item from the user via a kiosk located proximate a physical store associated with the merchant.

At 430, the one or more processors of transaction server 130 or transaction server 200 may process the first order and the second order in a single transaction.

In at least some embodiments, the first item may include an item offered for sale online at the website and available for pickup at the physical store associated with the merchant.

In at least some embodiments, the second item may include gasoline offered for sale at a gas station proximate the kiosk.

In at least some embodiments, example process 400 may further involve the one or more processors of transaction server 130 or transaction server 200 receiving an indication by the user that indicates arrival of the user at the kiosk.

In at least some embodiments, example process 400 may further involve the one or more processors of transaction server 130 or transaction server 200 collecting payment for the single transaction via a payment method associated with the user.

In at least some embodiments, example process 400 may further involve the one or more processors of transaction server 130 or transaction server 200 informing the user of availability of at least the second item via the second channel.

In at least some embodiments, example process 400 may further involve the one or more processors of transaction server 130 or transaction server 200 receiving an indication of payment by the user for the single transaction. Example process 400 may additionally involve the one or more processors of transaction server 130 or transaction server 200 providing to the user an acknowledgement of the payment for the single transaction in response to receiving the indication of the payment.

Figure 5:
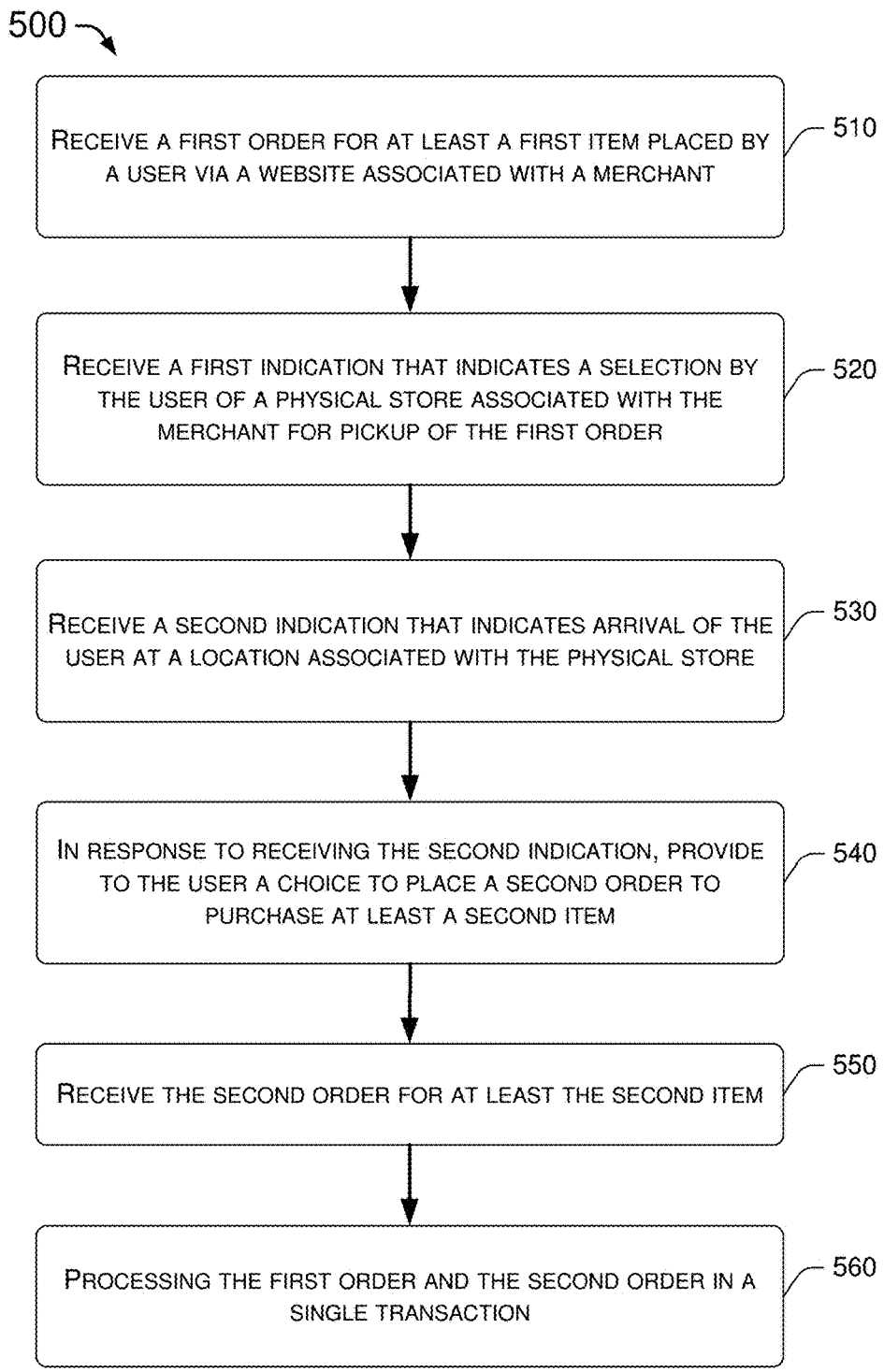
FIG. 5 is a flowchart diagram of yet another example process for combining online orders with additional purchases.

FIG. 5 is a flowchart diagram of yet another example process for combining online orders with additional purchases. Example process 500 may include one or more operations, actions, or functions such as 510, 520, 530, 540, 550 and 560. Although illustrated as discrete blocks, various blocks may be divided into additional blocks, combined into fewer blocks, or eliminated, depending on the desired implementation. Example process 500 may be implemented by one or more processors including, for example, processors of transaction server 130 and/or transaction server 200. For illustrative purposes, the operations described below are performed by one or more processors of transaction server 130 and/or processor 204 of transaction server 200. Each of transaction server 130 and transaction server 200 may be referred to as a computing device herein.

At 510, one or more processors of transaction server 130 or transaction server 200 may receive a first order for at least a first item placed by a user via a website associated with a merchant.

At 520, the one or more processors of transaction server 130 or transaction server 200 may receive a first indication that indicates a selection by the user of a physical store associated with the merchant for pickup of the first order.

At 530, the one or more processors of transaction server 130 or transaction server 200 may receive a second indication that indicates arrival of the user at a location associated with the physical store.

At 540, in response to receiving the second indication, the one or more processors of transaction server 130 or transaction server 200 may provide to the user a choice to place a second order to purchase at least a second item.

At 550, the one or more processors of transaction server 130 or transaction server 200 may receive the second order for at least the second item.

At 560, the one or more processors of transaction server 130 or transaction server 200 may process the first order and the second order in a single transaction.

In at least some embodiments, the location associated with the physical store may include a kiosk operated by the merchant in a proximity of the physical store. In at least some embodiments, the second item may include gasoline offered for sale at the location associated with the physical store.

In at least some embodiments, example process 500 may further involve the one or more processors of transaction server 130 or transaction server 200 receiving an indication of payment by the user for the single transaction.

In at least some embodiments, example process 500 may further involve the one or more processors of transaction server 130 or transaction server 200 providing to the user an acknowledgement of the payment for the single transaction in response to receiving the indication of the payment.

In at least some embodiments, example process 500 may further involve the one or more processors of transaction server 130 or transaction server 200 collecting payment for the single transaction via a payment method associated with the user.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method, comprising:
 receiving, by a computer system using one or more processors, via a first channel associated with one or more e-commerce online stores of a retail merchant, a first order from a computing device of a user to purchase at least a first item from the one or more e-commerce online stores of the retail merchant, wherein the user opts to pick up the first order at one or more brick and mortar stores of the retail merchant associated with a gas station, wherein the computing device of the user displays a first user interface comprising the first order;
 transmitting, by the computer system, a notification to the user that the first order has been delivered to a particular brick and mortar store of the one or more brick and mortar stores of the retail merchant;
 when the user arrives at the particular brick and mortar store to pick up the first order, receiving, by the computer system, a second order from the user from a second channel associated with the gas station of the particular brick and mortar store of the retail merchant to purchase at least a second item from the particular brick and mortar store, the at least the second item comprising gasoline from the gas station of the particular brick and mortar store of the retail merchant, wherein the second order changes the first user interface to display the first order and the second order as a confirmed order;
 after receiving the second order from the user, providing, by the computer system, a total cost of the first order and the second order to the user to permit the user to purchase the first order and the second order with a single payment while the user remains at the particular brick and mortar store of the retail merchant; and
 transmitting, by the computer system, a single receipt for the single payment to the user from a gas pump of the gas station associated with the particular brick and mortar store of the retail merchant to the user, as requested by the user, while the user remains at the particular brick and mortar store of the retail merchant.

2. The method of claim 1, wherein the receiving the first order from the computing device of the user to purchase at least the first item from the one or more e-commerce online stores of the retail merchant further comprises receiving the first order via an app installed on the computing device of the user, wherein the app is associated with the retail merchant.

3. The method of claim 2, wherein the at least the first item comprises an item offered for sale online at a website associated with the retail merchant.

4. The method of claim 1, wherein the receiving the second order from the user comprises receiving the second order from the user and entered by the user.

5. The method of claim 4, wherein the gas station associated with the particular brick and mortar store of the retail merchant is located proximate to the particular brick and mortar store of the retail merchant.

6. The method of claim 1, further comprising:
 informing, by the one or more processors, the user of availability of the at least the second item via the particular brick and mortar store.

7. The method of claim 1, further comprising:
 receiving, by the one or more processors, an indication of receipt of the single payment from the user for the first order and the second order.

8. The method of claim 1, further comprising configuring the first user interface to provide a choice to the user to place the second order for the at least the second item.

9. One or more computer-readable media storing a computer-executable instruction that, when executed by one or more processors, causes the one or more processors to perform operations comprising:
 receiving, via a first channel associated with one or more e-commerce online stores of a retail merchant, a first order from a computing device of a user to purchase at least a first item from the one or more e-commerce online stores of the retail merchant, wherein the user opts to pick up the first order at one or more brick and mortar stores of the retail merchant associated with a gas station, wherein the computing device of the user displays a first user interface comprising the first order;
 transmitting a notification to the user that the first order has been delivered to a particular brick and mortar store of the retail merchant;
 when the user arrives at the particular brick and mortar store to pick up the first order, receiving a second order from the user from a second channel associated with the gas station of the particular brick and mortar store of the retail merchant to purchase at least a second item from the particular brick and mortar store, the at least the second item comprising gasoline from the gas station of the particular brick and mortar store of the retail merchant, wherein the second order changes the first user interface to display the first order and the second order as a confirmed order;
 after receiving the second order from the user, providing a total cost of the first order and the second order to the user to permit the user to purchase the first order and the second order with a single payment while the user remains at the particular brick and mortar store of the retail merchant; and transmitting a single receipt for the single payment to the user from a gas pump of the gas station associated with the particular brick and mortar store of the retail merchant to the user, as requested by the user, while the user remains at the particular brick and mortar store of the retail merchant.

10. The one or more computer-readable media of claim 9, wherein the receiving the first order from the computing device of the user to purchase at least the first item from the one or more e-commerce online stores of the retail merchant further comprises receiving the first order via an app installed on the computing device of the user, wherein the app is associated with the retail merchant.

11. The one or more computer-readable media of claim 9, wherein the gas station associated with the particular brick and mortar store of the retail merchant is located proximate to the particular brick and mortar store of the retail merchant.

12. The one or more computer-readable media of claim 9, wherein the operations further comprise:
receiving an indication by the user that indicates arrival of the user at the particular brick and mortar store of the retail merchant.

13. The one or more computer-readable media of claim 12, wherein the operations further comprise:
collecting payment for the total cost of the first order and the second order via a payment method associated with the user to purchase the first order and the second order with a single payment while the user remains at the particular brick and mortar store of the one or more brick and mortar stores of the retail merchant.

14. The one or more computer-readable media of claim 9, wherein the operations further comprise:
informing the user of availability of the at least the second item via the particular brick and mortar stores of the retail merchant.

15. The one or more computer-readable media of claim 9, wherein the operations further comprise:
receiving an indication of payment by the user for the total cost of the first order and the second order; and
providing to the user an acknowledgement of the payment for the total cost of the first order and the second order in response to receiving the indication of the payment.

16. The one or more computer-readable media of claim 9, wherein the operations further comprises providing via the first user interface a choice to the user to place the second order for the at least the second item.

17. An apparatus, comprising:
a memory configured to store one or more sets of instructions;
a processor configured to access the memory to execute the one or more sets of instructions to perform operations comprising:
receiving, via a first channel associated with one or more e-commerce online stores of a retail merchant, a first order from a computing device of a user to purchase at least a first item from the one or more e-commerce online stores of the retail merchant, wherein the user opts to pick up the first order at one or more brick and mortar stores of the retail merchant associated with a gas station, wherein the computing device of the user displays a first user interface comprising the first order;
transmitting a notification to the user that the first order has been delivered to a particular brick and mortar store of the one or more brick and mortar stores of the retail merchant;
when the user arrives at the particular brick and mortar store to pick up the first order, receiving a second order from the user from a second channel associated with the gas station of the particular brick and mortar store of the retail merchant to purchase at least a second item from the particular brick and mortar store, the at least the second item comprising gasoline from the gas station of the particular brick and mortar store of the retail merchant, wherein the second order changes the first user interface to display the first order and the second order as a confirmed order;
after receiving the second order from the user, providing a total cost of the first order and the second order to the user to permit the user to purchase the first order and the second order with a single payment while the user remains at the particular brick and mortar store of the retail merchant; and
transmitting, by a computer system, a single receipt for the single payment to the user from a gas pump of the gas station associated with the particular brick and mortar store of the retail merchant to the user, as requested by the user, while the user remains at the particular brick and mortar store of the retail merchant.

18. The apparatus of claim 17, wherein the processor is further configured to receive an indication of payment by the user for the total cost of the first order and the second order purchased with the single payment while the user remains at the particular brick and mortar store of the retail merchant.

19. The apparatus of claim 18, wherein the processor is further configured to provide to the user an acknowledgement of the single payment for the total cost of the first order and the second order purchased in response to receiving the indication of the single payment.

20. The apparatus of claim 17, wherein the processor is further configured to collect payment for the total cost of the first order and the second order via a payment method associated with the user for a single payment while the user remains at the particular brick and mortar store of the retail merchant.

* * * * *